United States Patent [19]
Larkin

[11] Patent Number: 5,893,575
[45] Date of Patent: *Apr. 13, 1999

[54] HITCH ASSEMBLY

[75] Inventor: Kenneth M. Larkin, Redmond, Oreg.

[73] Assignee: Larkin Technology, Inc., Redmond, Oreg.

[*] Notice: This patent is subject to a terminal disclaimer.

[21] Appl. No.: 08/862,786

[22] Filed: May 23, 1997

Related U.S. Application Data

[63] Continuation-in-part of application No. 08/674,135, Jul. 1, 1996, Pat. No. 5,738,363, which is a continuation-in-part of application No. 08/441,445, May 15, 1995, Pat. No. 5,571,270.

[51] Int. Cl.$^6$ ............................................. B60D 1/18
[52] U.S. Cl. .............................. 280/491.1; 280/417.1; 280/457; 280/901
[58] Field of Search .................... 280/491.1, 491.3, 280/504, 511, 901, 415.1, 417.1, 457

[56] References Cited

U.S. PATENT DOCUMENTS

| | | | |
|---|---|---|---|
| 3,125,355 | 3/1964 | Snuggins | 280/457 |
| 3,132,878 | 5/1964 | De Puydt et al. | 280/457 |
| 3,827,722 | 8/1974 | Miller et al. | 280/432 |
| 3,869,148 | 3/1975 | Iehl | 280/457 |
| 3,870,343 | 3/1975 | McGahee | 280/457 |
| 3,889,978 | 6/1975 | Kann | 280/417.1 |
| 4,256,324 | 3/1981 | Hamilton | 280/415.1 |
| 4,540,194 | 9/1985 | Dane | 280/491.1 |
| 5,145,199 | 9/1992 | Howard | 280/495 |
| 5,435,585 | 7/1995 | Chambers | 280/415.1 |
| 5,788,258 | 8/1998 | Gill et al. | 280/491.1 |

*Primary Examiner*—Kevin Hurley
*Attorney, Agent, or Firm*—Kolisch, Hartwell, Dickinson, McCormack & Heuser

[57] ABSTRACT

A hitch assembly is provided with a hitch mount and a safety chain connector, both of which adjust to provide a hitch assembly which conforms substantially to the contour of the towing vehicle body when the hitch assembly is not in use. The hitch mount is configured for retractable extension from a hitch base plate, providing a seat for a matching trailer mount. The safety chain connector is configured to selectively provide a seat for a trailer-connected safety chain. The hitch base plate attaches to the towing vehicle body, defining a support surface which is contoured substantially similar to the body contour of the towing vehicle. The hitch mount and safety chain connector are adjustable such that the hitch assembly may be conformed generally to the body contour of the towing vehicle, thus minimizing any interference with the vehicle's use.

20 Claims, 7 Drawing Sheets

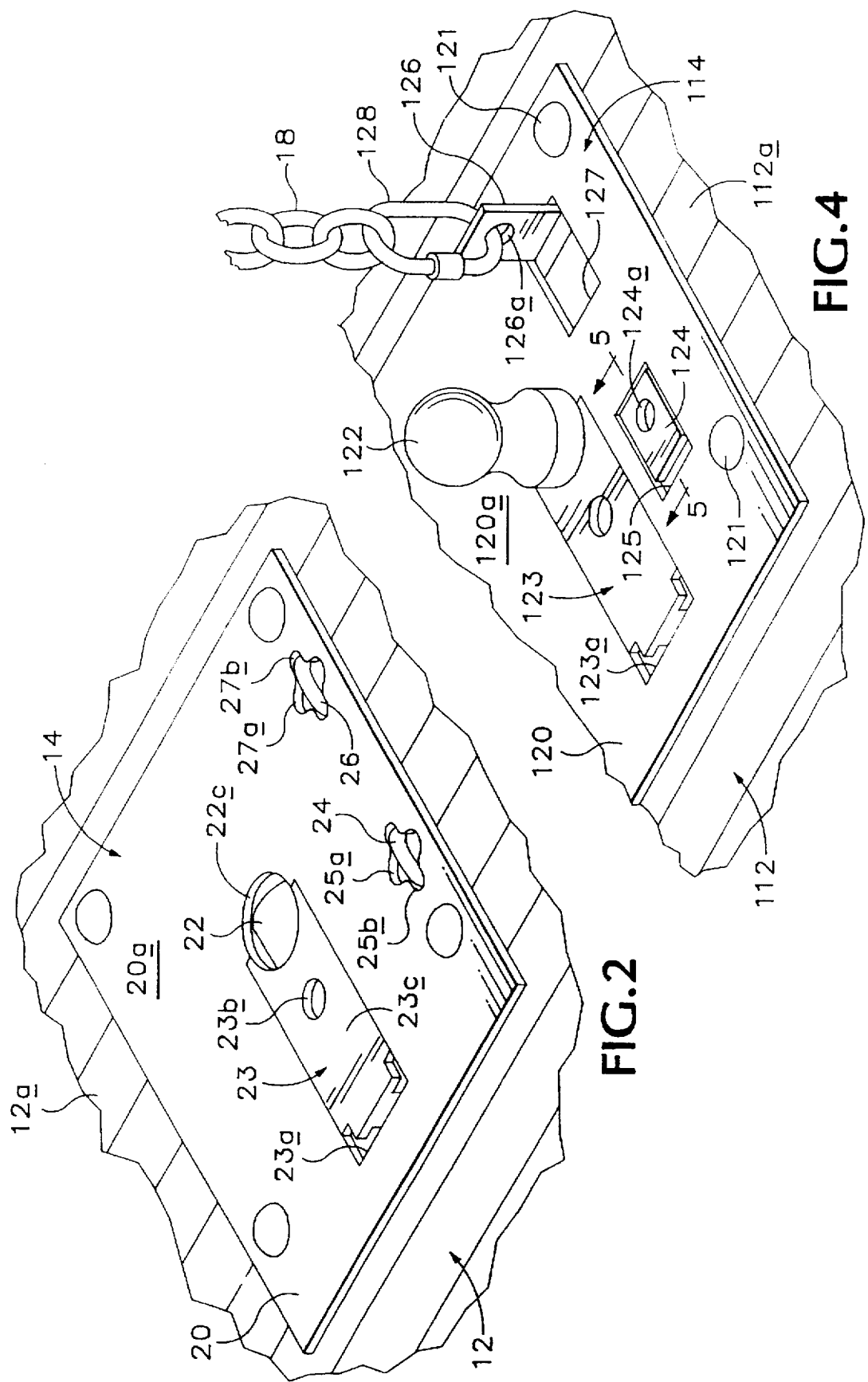

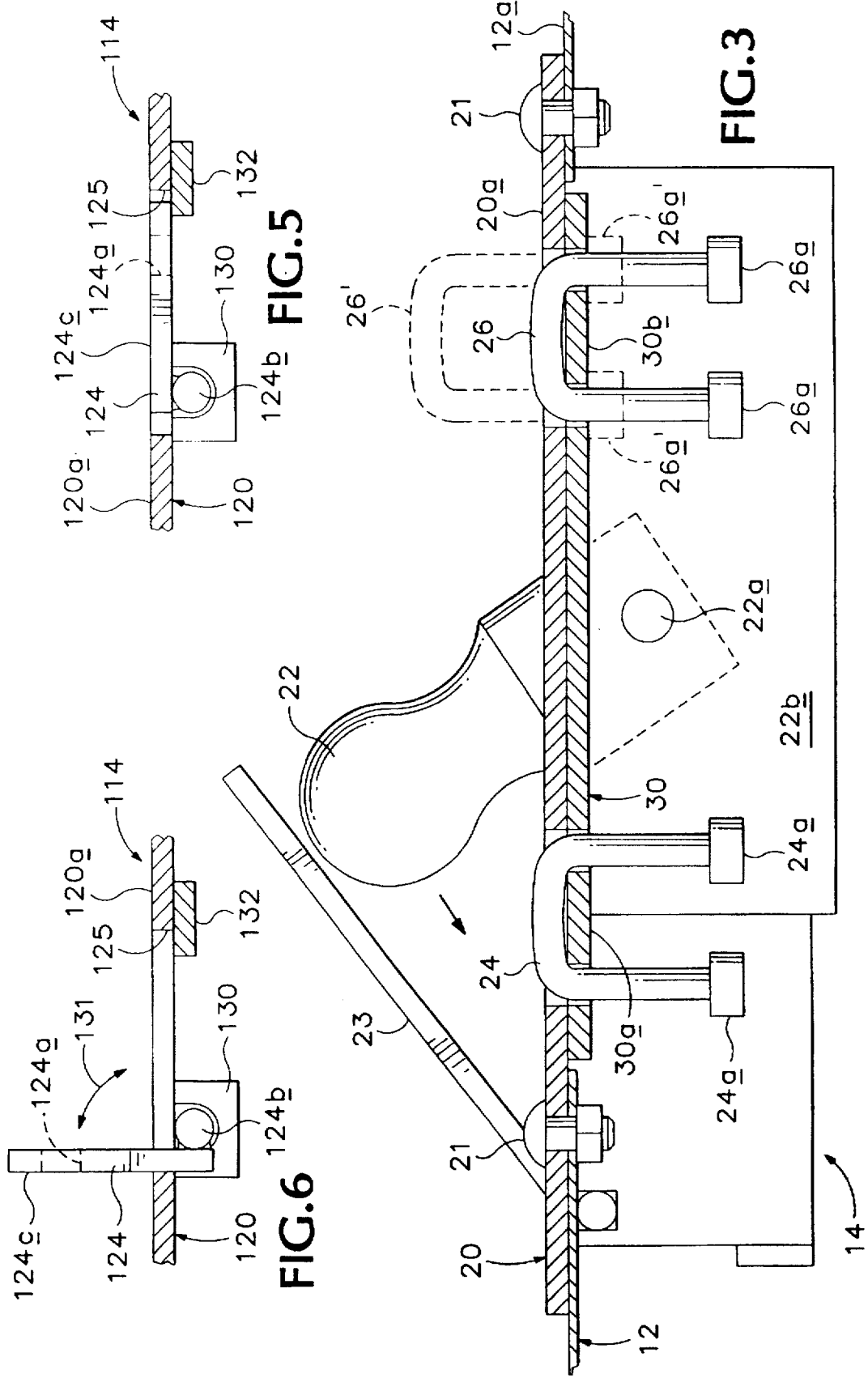

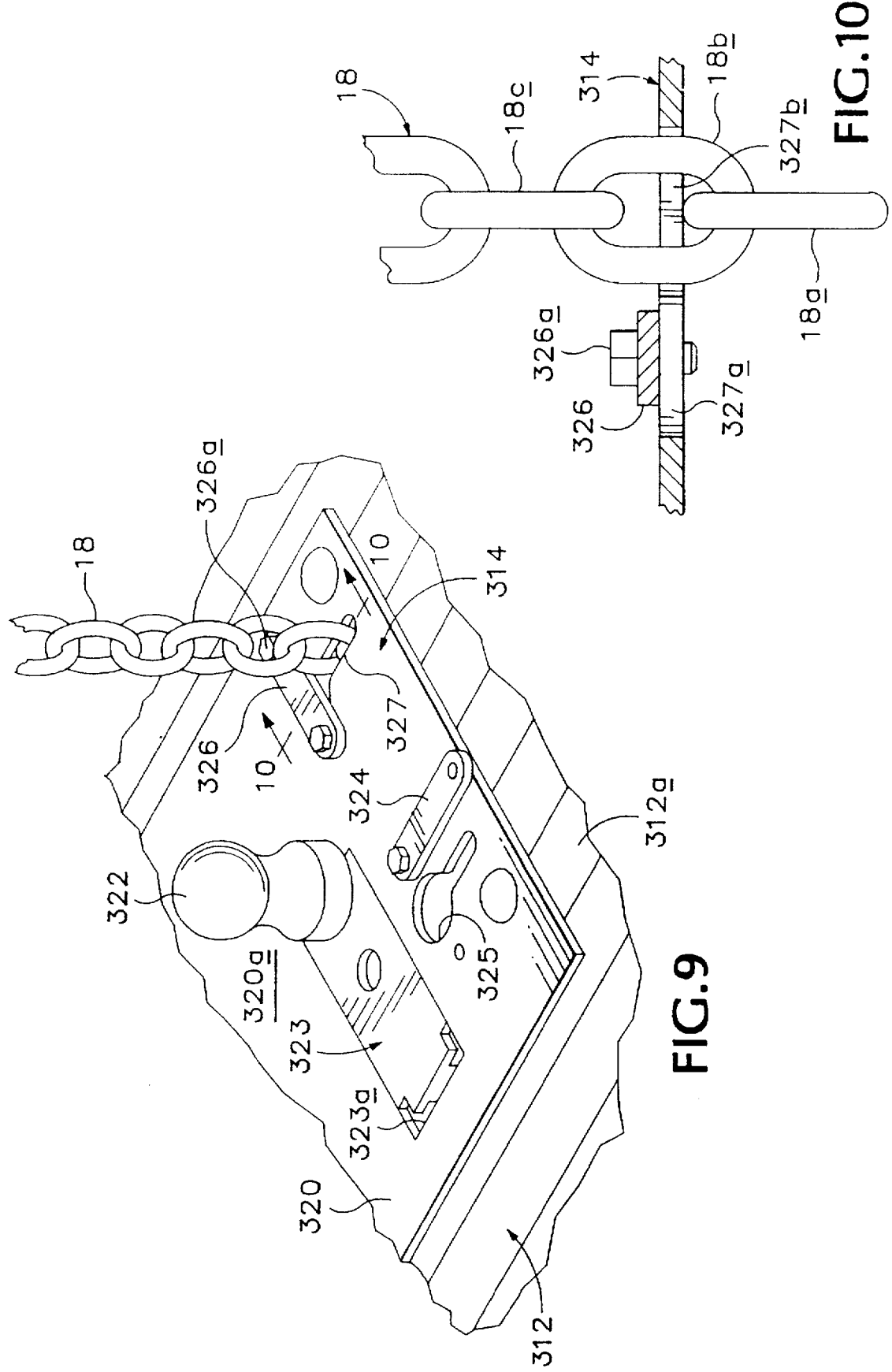

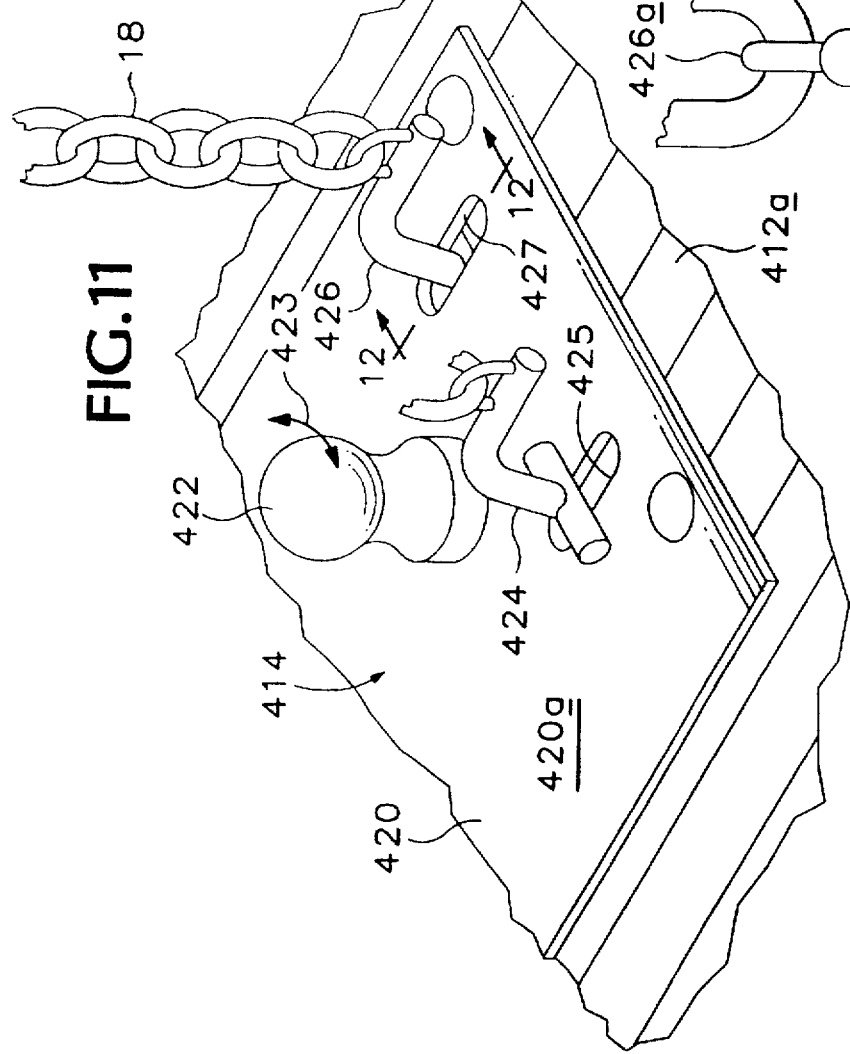

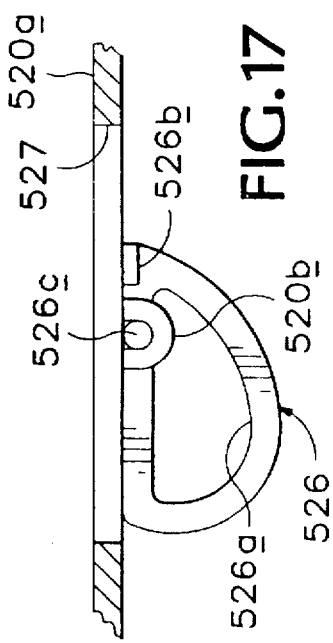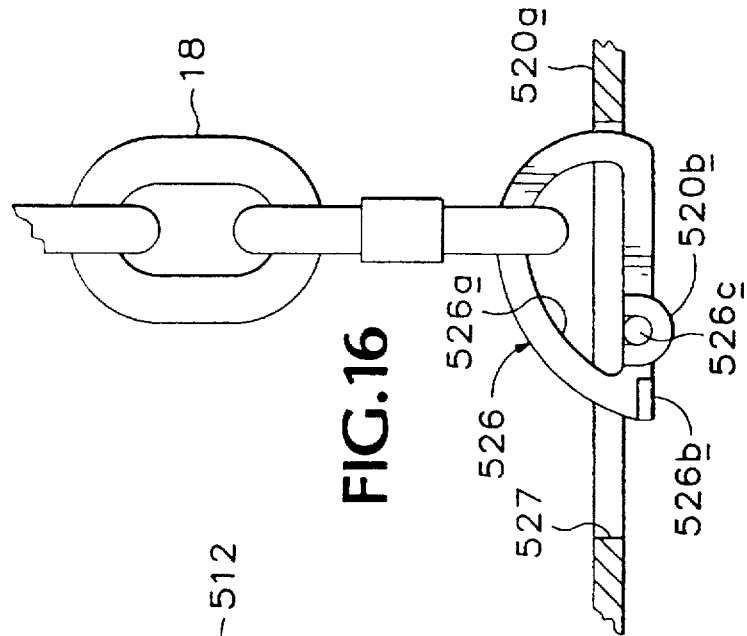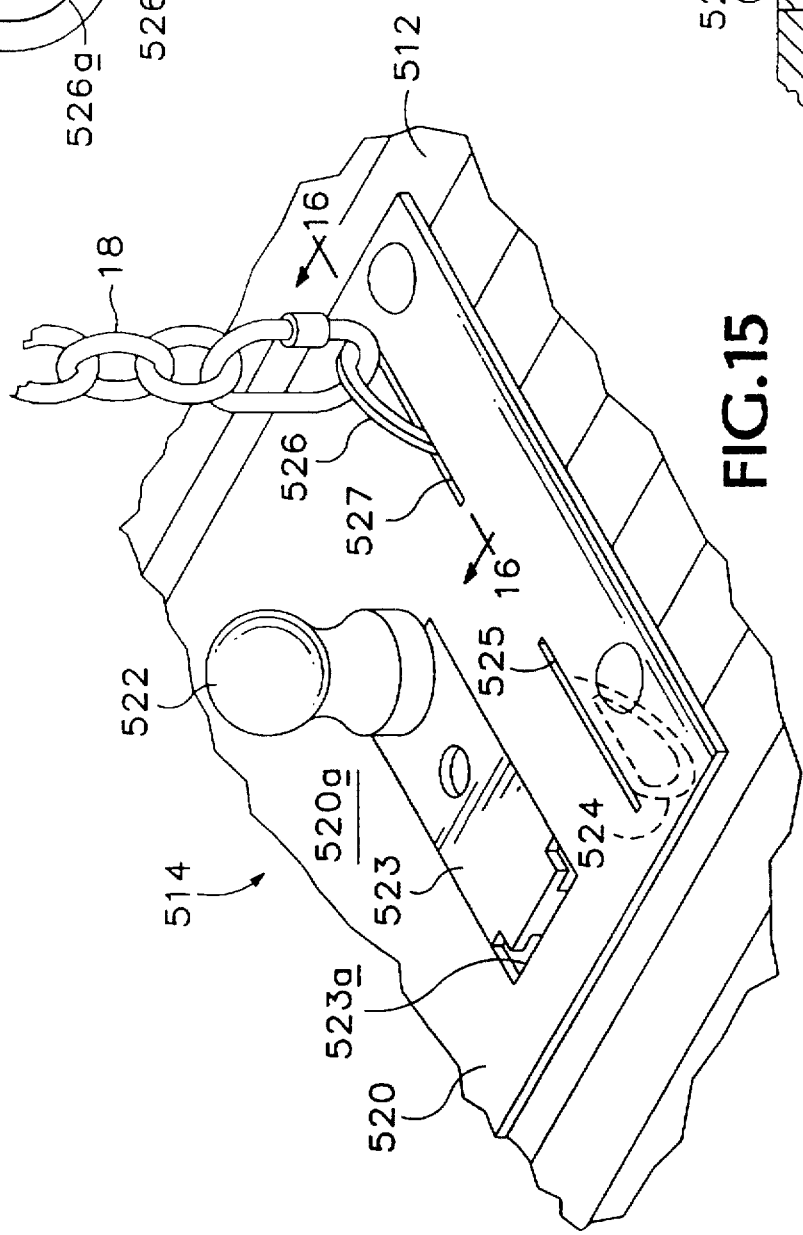

HITCH ASSEMBLY

CROSS REFERENCE TO RELATED APPLICATIONS

This application is a continuation-in-part of U.S. patent application Ser. No. 08/674,135 filed Jul. 1, 1996, now U.S. Pat. No. 5,738,363, which is a continuation-in-part of U.S. patent application Ser. No. 08/441,445 filed May 15, 1995, now U.S. Pat. No. 5,571,270.

TECHNICAL FIELD

The present invention relates generally to hitches, and more particularly, to a hitch assembly which employs a hitch mount and a safety chain connector, both of which may be adjusted so as to establish a hitch assembly which conforms substantially to the contour of the surface on which the assembly mounts. This arrangement has proven especially useful in the context of a fifth wheel hitch assembly of the type which may be found in the bed of a pick-up truck or flat bed truck, and the invention is described in that context below.

BACKGROUND ART

For a number of years now, various states have required the use of chains, or cables, as a measure of safety when coupling a towing vehicle with a trailer which is to be towed. In a typical hitch assembly, such chains extend from the trailer to the towing vehicle, providing a secondary coupling for use in the event of a failure of the primary coupling, i.e. a failure of the hitch mount. These so-called safety chains have proven particularly important where the coupling is temporary, such as that which is provided by a typical ball and socket hitch. Ball and socket hitches, it will be understood, are specially designed to provide for selected decoupling of the towed and towing vehicles, and thus may suffer from unintentional decoupling of such vehicles while in use.

Ball and socket hitch assemblies have been characterized by a variety of configuration, serving variously to carry everything from small utility trailers (e.g., by a rear bumper hitch configuration) to large boats and campers (e.g., by a fifth wheel hitch configuration). Safety chains have found utility in many of these configurations, including fifth wheel hitch configurations where the load carried by the hitch is substantial, and the consequences of hitch failure are correspondingly severe. Such fifth wheel hitches commonly mount to the towing vehicle's body, most often being secured to the bed of a flat bed truck. Other fifth wheel hitches mount to the roof of the towing vehicle, or to another vehicle body surface which will provide adequate structural support.

Because most hitches are used intermittently, manufacturers long have sought to provide a hitch assembly which detachably mounts to the vehicle, or which may easily and quickly be adjusted so as to provide only minimal interference with the vehicle's use. One such hitch (manufactured by Atwood Mobile Products of Rockford, Ill.) has been provided with a retractable hitch ball, the hitch assembly being mounted above an opening in the vehicle body, and the hitch ball being retractable into such opening so as to diminish interference of the hitch with normal vehicle appearance and use. The Atwood hitch assembly, however, has not adequately addressed the need for safety chains, having failed to provide a connector to which a safety chain may be secured. It thus would be desirable to provide a hitch assembly including a safety chain connector which is retractable so as to minimize interference with the vehicle's use.

DISCLOSURE OF THE INVENTION

The aforementioned object is addressed by provision of a hitch assembly with a hitch mount and a safety chain connector, both of which are adjustable to provide a hitch assembly which conforms substantially to the contour of the towing vehicle body when the hitch assembly is not in use. The hitch mount is configured for selected extension from a hitch base plate, providing a seat for a matching trailer mount. The safety chain connector also is configured for selected extension from the base plate to provide a seat for a trailer connected safety chain. The hitch base plate is configured for attachment to the towing vehicle body, defining a support surface which is contoured substantially similar to the body contour of the towing vehicle (typically the bed of a pick-up truck or flat bed truck). The hitch mount and safety chain connector thus may be adjusted to minimize any interference with the vehicle's use.

Typically, the base plate defines a hitch mount recess configured to house the hitch mount, and a pair of safety chain recesses configured to house a pair of safety chain connectors, which may take the form of a loop segment a flap, or a tab. Alternatively, the safety chain recesses may provide for selected attachment of a safety chain connector, or may define specially-shaped openings or holes which act as safety chain connectors themselves. In any case, the safety chain connectors provide seats for the trailer's safety chains.

In one embodiment of the invention, the safety chain connectors take the form of safety chain recesses configured to hold trailer-mounted safety chains using adjustable safety chain keepers which selectively block removal of the safety chains through the safety chain recesses. Another embodiment employs a safety chain connector which is detachable by manipulation thereof to accommodate passage of an associated connector keeper through an opening in the hitch assembly's base plate. In yet another embodiment, the safety chain connectors take the form of pivotal tabs, each of which pivots between a first orientation wherein the tab extends through an upper surface of the base plate to expose a safety chain eyelet, and a second orientation wherein the tab lies at or below the upper surface of the base plate. In the foregoing embodiment, the tabs may be weighted, providing for selected pivot of the tabs to either the first or the second orientation.

When the hitch assembly is not in use, the hitch mount is adjusted, typically by retraction of the hitch mount into the hitch mount recess, or by removal of the hitch mount entirely from the base plate. The safety chain connectors also are adjusted, typically being retracted into the safety chain recesses, or removed entirely as described above. The hitch assembly thus may be configured to lie generally flush with the vehicle body contour (e.g., a generally planar truck bed). Accordingly, the towing vehicle may be configured to safely tow a trailer using the invented hitch assembly, but may readily be adapted for other functions when the hitch assembly is not in use.

These and other objects and advantages of the present invention will be more readily understood after a consideration of the drawings and the detailed description which follows.

BRIEF DESCRIPTION OF THE DRAWINGS

FIG. 2 is an isometric view of the hitch assembly shown in FIG. 1, the hitch assembly's hitch mount and safety chain connectors having been retracted such that the hitch assembly lies generally flush with the truck bed.

FIG. 3 is a sectional view of the hitch assembly of FIG. 1, the hitch assembly being sectioned along lines 3—3 to illustrate retraction and extension of the hitch mount and safety chain connectors.

FIG. 4 is a partial isometric view of a first alternative embodiment hitch assembly, such assembly being mounted in the bed of a truck in a configuration whereby a trailer may be coupled therewith.

FIG. 5 is a fragmentary sectional view of the hitch assembly of FIG. 4 taken generally along lines 5—5 thereof to show a safety chain connector in a retracted orientation.

FIG. 6 is a fragmentary sectional view similar to that of FIG. 5, but with the safety chain connector extended for coupling with a safety chain.

FIG. 9 is a partial isometric view of a third alternative embodiment hitch assembly, such assembly being mounted in the bed of a truck in a configuration whereby a trailer may be coupled therewith.

FIG. 10 is a fragmentary sectional view taken generally along lines 10—10 of the hitch assembly in FIG. 9.

FIG. 11 is a partial isomeric view of a fourth alternative embodiment hitch assembly, such assembly being mounted in the bed of a truck in a configuration whereby a trailer may be coupled therewith.

FIG. 12 is a fragmentary sectional view taken generally along lines 12—12 of the hitch assembly in FIG. 11.

FIG. 13 is a fragmentary sectional view taken generally transverse to lines 12—12 to illustrate capture of a safety chain connector.

FIG. 14 is a fragmentary sectional view similar to FIG. 13, but with the safety chain connector rotated to provide for removal thereof from the hitch assembly.

FIG. 15 is a partial isometric view of a fifth alternative embodiment hitch assembly, such assembly once again being mounted in the bed of a tuck in a configuration whereby a trailer may be coupled therewith.

FIG. 16 is a fragmentary sectional view of the hitch assembly in FIG. 15 taken generally along lines 16—16 thereof to show a safety chain connector in an extended orientation.

FIG. 17 is a fragmentary side sectional view similar to that of FIG. 16, but with the safety chain connector in a retracted orientation.

DETAILED DESCRIPTION OF THE PREFERRED EMBODIMENT AND BEST MODE OF CARRYING OUT THE INVENTION

Figure 1:
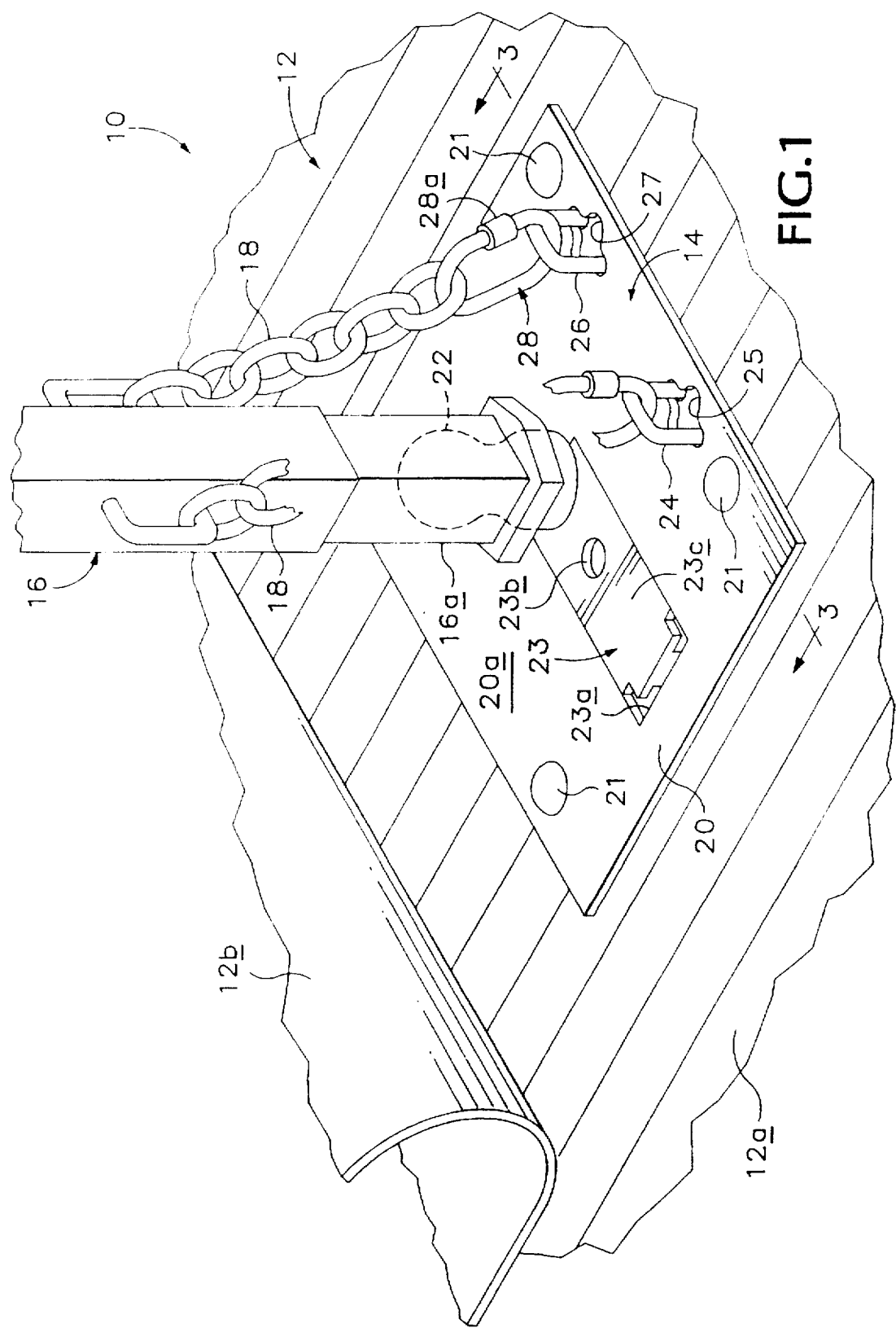
FIG. 1 is an isometric view of a hitch assembly constructed in accordance with a preferred embodiment of the invention, such hitch assembly being mounted in the bed of a track and carrying a trailer with a pair of safety chains.

Referring initially to FIG. 1, it will be understood that a fragment of a conventional towing vehicle 10 has been shown, such vehicle providing a setting for the hitch invention which is herein described.

As indicated, vehicle 10 takes the form of a conventional pick-up truck, having a bed 12 in which a fifth wheel hitch assembly 14 mounts. The truck's bed typically defines a generally planar vehicle body surface 12a which may be covered by a removable mat such as that shown at 12b. Hitch assembly 14 is constructed in accordance with a preferred embodiment of the present invention, being adapted for coupling with a trailer 16 and a pair of associated safety chains 18.

Focussing attention now on fifth wheel hitch assembly 14, it will be noted that such assembly includes a base plate 20 having a generally planar upper support surface 20a. The base plate is secured to the bed of the towing vehicle, generally being mounted centrally over a hole, or opening, through which the hitch assembly's underbody may be received (FIG. 3). Fasteners, such as those shown at 21, operatively secure the hitch assembly to the vehicle frame.

The base plate is relatively thin, generally being ⅛-inch thick or less, and is contoured substantially similar to the contour of vehicle body surface 12a. Upper support surface 20a thus will be understood to lie generally flush with the vehicle body surface 12a so as to minimize any interference with the vehicle's use. This is particularly important where the hitch assembly is mounted in a truck bed where a generally flat surface is desired. It will be appreciated, however, that the support surface may be shaped variously in accordance with the contour of the body surface on which the hitch assembly mounts.

When configured as shown in FIG. 1, hitch assembly 14 will be seen to include a hitch mount which extends upwardly from the base plate in the form of a common hitch ball 22. As shown, the hitch ball is configured to couple with a matching trailer mount in the form of a trailer tow bar 16a which extends over the hitch ball and locks in place using a conventional locking mechanism (not shown). Hitch ball 22 thus acts as a primary coupling between the towing vehicle and the trailer which is towed thereby.

As indicated, the hitch ball is adjustable, the base plate typically being provided with a pivotal trap door 23 which may be pivoted to uncover a hitch mount recess 23a. The trap door 23 defines a finger opening 23b which provides for gripping by a hitch operator to readily open and close the trap door. Once the hitch mount recess is uncovered, the hitch ball may be pivoted, or otherwise retracted, into the hitch mount recess, and the trap door closed so as to cover the hitch ball. This operation is best illustrated in FIG. 3, where the hitch ball is may be pivoted, or otherwise retracted, into the hitch mount recess, and the trap door closed so as to cover the hitch ball. This operation is best illustrated in FIG. 3, where the hitch ball is shown pivoting about an axis defined by pivot pin 22a.

The retracted hitch ball lies within a housing 22b, which is below the level of base plate support surface 20a and is covered by the closed trap door 23. When closed, the trap door's upper surface 23c lies generally flush with the base plate support surface. FIG. 2 shows the hitch assembly with the hitch ball retracted and the trap door closed.

In the depicted embodiments, trap door 23 serves a dual purpose, serving both as a cover for a retracted hitch ball (FIG. 2), and as a locking mechanism whereby the hitch ball is held in its upright orientation when it is extended and the trap door is closed (FIG. 1). It will be noted, for example, that the base plate and trap door collectively define a circular opening 22c (FIG. 2) when the trap door is closed. Such circular opening closely conforms to the size and shape of the foundation of the hitch mount.

It will be understood that the hitch mount also may be configured for selected removal from the base plate. This typically is accomplished by provision of hitch mount in the form of a hitch ball which is either threaded for receipt by a correspondingly threaded opening in the base plate or otherwise secured to the base plate via other fastening mechanisms such as the Draw-Tite® removable ball gooseneck hitch (Part No. 6300). The hitch ball thus may be applied or removed from the base plate simply by turning the hitch ball relative to the base plate. Accordingly, the hitch ball is configured for selected extension from the base plate, configurable to provide seats for one or more trailer-connected safety chains. However, as described in detail below, the safety chain connectors are configurable to provide a hitch assembly which conforms generally to the body contour of the towing vehicle when the hitch assembly is not in use.

In one embodiment (FIGS. 1–3), the secondary coupling is provided by a safety chain connector arrangement in the form of a pair of safety chain connectors 24, 26 which are coupled with the hitch base plate via a keeper arrangement 30. The safety chain connectors provide seats for safety chains 18. The safety chain connectors also preferably are arranged symmetrically about the hitch ball (on the portion of the hitch base plate which is toward the rear of the towing vehicle) so as to provide a somewhat stable secondary coupling between trailer 16 and towing vehicle 10.

As indicated, safety chain connectors 24, 26 extend upwardly from the base plate when in use (FIG. 1), but retract into base plate recesses when the hitch assembly is not in use (FIGS. 2 and 3). Connector 24 thus will be seen to retract into safety chain recess 25. Connector 26 retracts into a similar safety chain recess 27. Each safety chain recess is defined by a pair of transversely-intersecting elongate slot portions 25a, 25b, 27a, 27b which allow for ready grasping of the retracted safety chain connectors to pull them out from safety chain recesses 25, 27. Those skilled will understand, of coarse, that safety chain recesses of various shapes may be employed.

Each connector takes the form of a loop segment which defines an eyelet through which a safety chain may be connected to the hitch base plate. Such connection is made via a removable safety chain link 28 which includes an opening selectively closed by a treaded sleeve 28a or other means such as a locking hook, clip latch, etc. To remove the safety chain, the hitch operator need only turn sleeve 28a so as to expose an opening in link 28 and then slide the safety chain connector 26 through the opening in link 28. Similarly, links 28 may be removed from the safety chain by passing the safety chain through the opening in link 28.

Keeper arrangement 30 includes a pair of transverse keeper bars 30a, 30b, each of which extends within a safety chain recess to keep a corresponding safety chain connector in coupled relation with the hitch base plate. The safety chain connectors, it will be noted, are configured for limited movement relative to the keeper bars, each including a pair of stops 24a, 26a. As should be apparent from the dashed line illustration of the right side safety chain connector identified as 26' in FIG. 3, removal of the safety chain connector will be prohibited by contact between stops 26a' and keeper bar 30b.

The safety chain connectors and hitch mount collectively may be considered to be a trailer coupling arrangement. The safety chain recesses and hitch mount recesses collectively may be considered a trailer coupling recess arrangement. It will be appreciated that the trailer coupling arrangement and trailer coupling recess arrangement both may vary without departing from the invention as claimed.

As indicated in FIGS. 2 and 3, the safety chain connectors and the hitch mount all retract into corresponding recesses to provide a hitch assembly which lies generally flush with the surface 12a of the truck bed. It thus will be appreciated that bed mat 12b (FIG. 1) may be placed over the hitch assembly, making the hitch assembly virtually undetectable to the towing vehicle's operator when the hitch assembly is not in use.

In a first alternative embodiment of the invention, shown in FIG. 4 through 6, a hitch assembly 114 is provided with an alternative safety chain connector arrangement in the form of a pair of pivotal flaps 124, 126. Hitch assembly 114 mounts in a truck bed 112 on a generally planar vehicle body surface 121a, and is configured for use in coupling the truck to a trailer such as that indicated at 16 in FIG. 1. Trailer 16, it will be recalled employs a pair of trailer-connected safety chains such as that shown at 18.

Like hitch assembly 14, hitch assembly 114 includes a tin base plate 120 with a generally planar upper support surface 120a. The base plate is secured to the towing vehicle over a hole, or opening, securement being accomplished via fasteners such as those shown at 121. A hitch mount in the form of a common hitch ball 122 extends upwardly from the base plate to couple with a matching trailer mount. The hitch ball is retractable through a trap door 123 which lies generally flush with the base plate's upper support surface when closed to cover hitch mount recess 123a.

Unlike the hitch assembly shown in FIGS. 1 through 3, however, the hitch assembly of FIGS. 4 through 6 includes the safety chain connector arrangement in the form of a pair of flaps 124, 126, each of which is pivotally retractable into a corresponding safety chain recess 125, 127. Each safety chain recess is shaped similarly to its corresponding flap. Although the depicted flaps are rectangular, it will be understood that such flaps may take a variety of other shapes. The flaps and safety chain recesses are arranged symmetrically about the hitch mount. Each of the safety chain connector flaps defines an eyelet 124a, 126a, such eyelets being configured to receive a removable safety chain link (or hook) such as that shown at 128. The removable safety chain links, in turn, connect to the safety chains.

Referring now to FIGS. 5 and 6, where flap 124 is shown in detail, it will be noted that such flap is mounted in a socket 130 for pivot between a retracted orientation (FIG. 5) and an extended orientation (FIG. 6) about an axis defined by pin 124b. Such pivot is illustrated by arrow 131 in FIG. 6. In the retracted orientation, the flap rests against ledge defined by a stop 132. In the extended orientation, the flap rests against the recess wall. The flap defines a support surface 124c which, when closed, lies generally flush with upper support surface 120a.

The safety chain connectors and hitch mount (collectively, the trailer coupling) of the hitch assembly shown in FIGS. 4 through 6 therefore will be understood to retract into corresponding recesses (collectively, the trailer coupling recess arrangement) to provide a hitch assembly which lies generally flush with the towing vehicle's body surface. Hitch assembly 114 thus is configurable to lie generally flush with the towing vehicle body surface so as to interference with towing vehicle appearance and utility when the hitch assembly is not in use.

Figure 8:
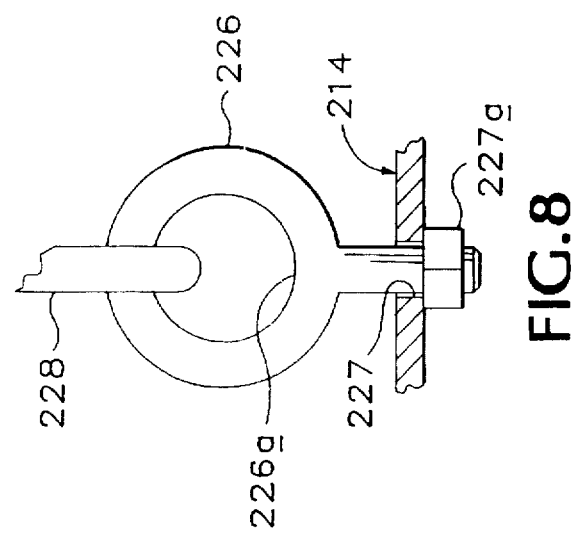
FIG. 8 is a fragmentary sectional view taken generally along lines 8—8 of the hitch assembly in FIG. 7.
Figure 7:
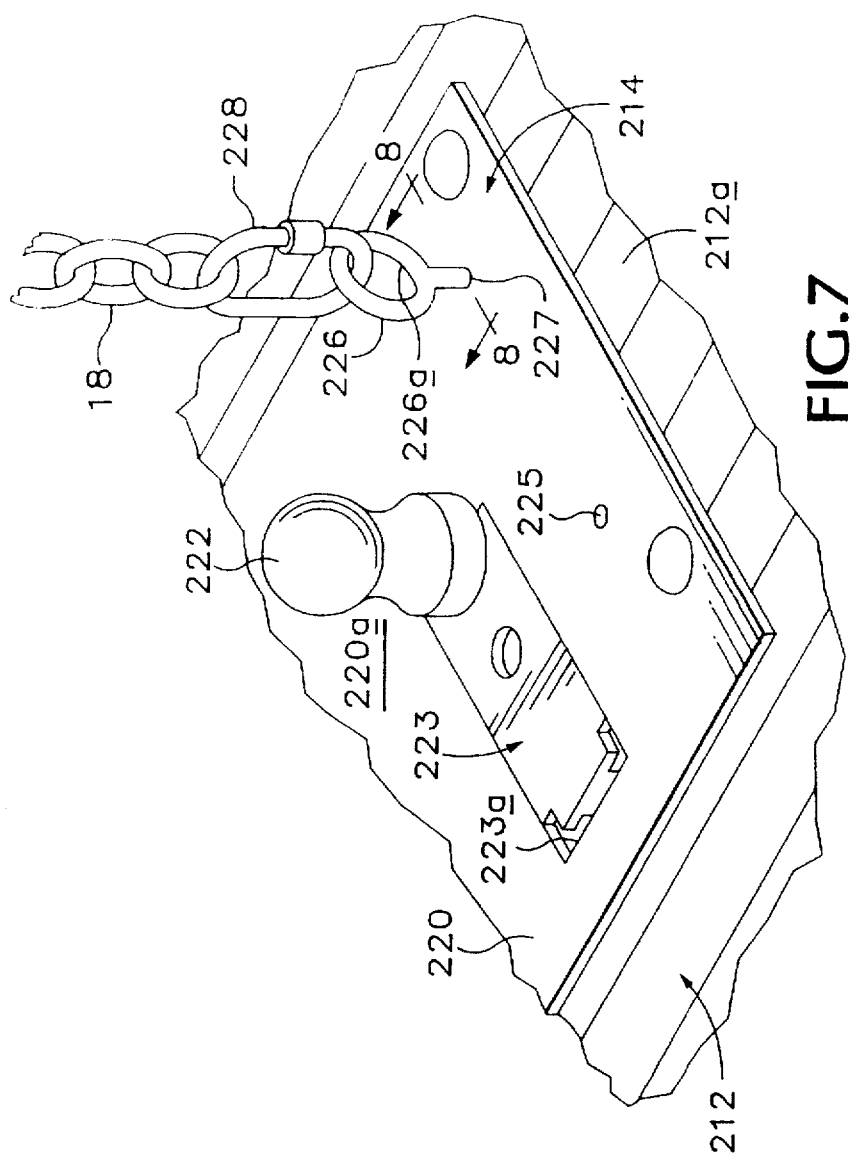
FIG. 7 is a partial isometric view of a second alternative embodiment hitch assembly, such assembly being mounted in the bed of a truck in a configuration whereby a trailer may be coupled therewith.

In FIGS. 7 and 8, a second alternative embodiment of the invented hitch assembly is shown generally at 214, such embodiment being provided with a second alternative safety chain connector arrangement. As indicated, hitch assembly 214 is suited for mounting in a truck bed 212 on a generally planar surface 212a, and is configured for use in coupling the truck to a trailer such as that shown in FIG. 1. The hitch assembly thus includes a thin base plate 220 with a generally planar upper support surface 220a which conforms generally to the body contour of the truck bed when the hitch assembly is not in use. The base plate is secured to the towing vehicle over a hole, or opening, securement being accomplished via conventional fasteners.

In accordance with my teachings, hitch assembly 214 is configured to capture the trailer's tow bar, the assembly including a hitch mount in the form of a common hitch ball 222 which extends upwardly from the base plate to couple with a matching trailer mount (not shown). The hitch ball is retractable through a trap door 223 which lies generally flush with the base plate's upper support surface when closed to cover hitch mount recess 223a.

Hitch assembly 214 also includes a safety chain connector arrangement 226 for use in holding one or more trailer-connected safety chains (one of which is shown at 18 in FIG. 7). As indicated, the depicted safety chain connector arrangement takes the form of one or more eyelet members (only one is shown in FIG. 7), which preferably are threaded to accommodate capture thereof by correspondingly threaded safety chain recesses 225, 227. Referring to FIG. 8, it will be noted that such threaded combination may be achieved by securing a threaded nut 227a to the underside of base plate 214 and in alignment with safety chain recess 227. The threaded end of the eyelet member thus may be selectively applied and removed so as to provide a hitch assembly which may be adjusted to conform to the vehicle body contour.

The eyelet members typically are arranged symmetrically about the hitch mount. Each eyelet member defines an eyelet 226a, which is configured receive a removable safety chain link such as that shown at 228. The removable safety chain link, in turn, connects to safety chain 18 as shown. Although the depicted eyelets are circular, it will be understood that such eyelets may take a variety of other shapes.

In FIGS. 9 and 10, a third alternative embodiment of the invention is shown, the depicted hitch assembly 314 being provided with yet another alternative safety chain connector arrangement. As indicated, such arrangement employs one or more safety chain recesses 325, 327 which have been specially configured to provide for selected capture of trailer-mounted safety chains such as that shown at 18. This is accomplished, in part, by using safety chain keepers 324, 326, each of which is configurable to block removal of a safety chain from a corresponding safety chain recess.

Like the previously-described embodiments, hitch assembly 314 is configured for use in a truck bed 312, the assembly being mounted on a generally planar vehicle body surface 312a. Accordingly, hitch assembly 314 includes a thin base plate 320 with a generally planar upper support surface 320a. The base plate is secured to the towing vehicle over a hole, or opening, securement being accomplished via conventional fasteners. A hitch mount in the form of a common hitch ball 322 extends upwardly from the base plate to couple with a matching trailer mount. The hitch ball is retractable through a trap door 323 which lies generally flush with the base plate's upper support surface when closed to cover hitch mount recess 323a.

As indicated above, the safety chain connector arrangement employs a pair of safety chain recesses 325, 327, each of which is shaped to provide for receipt of a safety chain therethrough. Corresponding safety chain keepers 324, 326 are mounted adjacent the recesses, each keeper being adjustable to accommodate selected obstruction of an adjacent recess so as to help hold the safety chain in place. This is illustrated in FIG. 10, where a safety chain 18 is shown to have links 18a, 18b and 18c, each of which is turned relative to adjacent links. In order to allow passage of chain 18 through the safety chain recess, the recess must be shaped to accommodate passage of all links. This is achieved by provision of a recess having an enlarged portion 327a. In order to hold the chain in place, opening 327 is at least partially blocked by safety chain keeper 326. The safety chain thus must pass through a smaller portion 327b of the recess which is not wide enough for passage of adjacent chain links. Base plate 320 thus obstructs passage of link 18a through the safety chain recess.

In the embodiment shown in FIGS. 9 and 10, it will be noted that each safety chain keeper is pivotally adjustable between a first orientation wherein the safety chain keeper at least partially covers the safety chain recess (keeper 326 is shown in the first orientation), and a second orientation wherein the safety chain recess is uncovered (keeper 324 is shown in the second orientation). The keepers may be locked in place using threaded fasteners (one of which is shown at 326a) which secure the keepers to correspondingly-threaded fastener recesses.

Yet another alternative embodiment of the invented hitch assembly is shown at 414 in FIGS. 11 and 12, the depicted hitch assembly being suited for use in selectively providing a mount for coupling a vehicle with a trailer such as that shown at 16 in FIG. 1. More particularly, the hitch assembly is shown mounted in the bed of a pick-up truck on a generally planar truck bed surface 412a. The hitch assembly includes a thin base plate 420 with a generally planar upper support surface 420a which conforms generally to the body contour of the truck bed when the hitch assembly is not in use. The base plate is secured to the towing vehicle over a hole, or opening, securement typically being accomplished via conventional fasteners as shown.

As indicated, the hitch assembly is configured to capture the trailer's tow bar, the assembly including a hitch mount in the form of a hitch ball 422 which may be configured to extend upwardly from the base plate to couple with a matching trailer mount (not shown). The hitch ball is adjustable, typically by removal thereof from the base plate, or by retraction through an opening in the base plate. In either case, the hitch ball may be considered to be removed from extension from the base plate. In the depicted embodiment, the hitch ball is threaded such that it may be applied or removed by simple rotation of the hitch ball as indicated by arrow 423.

The hitch assembly also includes a safety chain connector arrangement for use in holding one or more trailer-connected safety chains (one of which is shown at 18 in FIG. 11). The depicted safety chain connector arrangement takes the form of one or more removable safety chain connectors 424, 426 which preferably are configured to accommodate selected capture thereof by correspondingly configured safety chain recesses 425, 427. Safety chain connector 424 is free from the base plate. Safety chain connector 426 is captured by recess 427.

Referring now to FIGS. 12–14, it will be noted that each safety chain connector includes an eyelet portion 426a, which may be connected to a safety chain. It also will be noted that each safety chain connector includes a generally T-shaped keeper portion 426b which may be inserted and removed through a corresponding safety chain recess to selectively hold the connector in place. The keeper portion typically is bent to provide a connector which is readily grippable, and to avoid inadvertent loss of the connector through the safety chain recess. The safety chain connectors may be cast, forged, or otherwise formed to provide suitable strength as required by statute or code.

The safety chain recess may be provided with a grip portion 427a which acts as a seat for keeper portion 426b. The keeper portion thus may be removed from the recess by first positioning the keeper portion's cross member below the grip portion (shown by arrow 430), second, rotating the connector to bring the cross member into alignment with the safety chain recess (shown by arrow 432), and third, lifting the connector to draw the keeper portion through the recess (shown by arrow 433).

In FIGS. 15, 16 and 17, a fifth alternative embodiment of the invented hitch assembly is shown, the depicted assembly being indicated generally at 514. In accordance with my teachings, the hitch assembly is shown mounted in a pick-up truck bed 512, the hitch assembly including a in base plate 520 with a generally planar upper support surface 520a which conforms generally to the contour of the truck bed. The base plate is secured to the bed over a hole, or opening, such securement typically being accomplished via conventional fasteners such as bolts, screws, or the like.

As indicated, the hitch assembly employs a retractable hitch mount, the hitch mount taking the form of a hitch ball 522 which extends upwardly from the base plate to couple with a matching trailer mount. The hitch ball is pivotally retractable rough a trap door 523 which lies generally flush with the base plate's upper support surface when closed to cover hitch mount recess 523a.

The hitch assembly also employs a safety chain connector arrangement which includes one or more safety chain connectors 524, 526, each of which is retractable through a corresponding safety chain recess 525, 527. In the depicted embodiment, the safety chain connectors take the form of generally planar D-shaped tabs, each of which is pivotal in a plane defined by the tab between an extended orientation (FIG. 16) and a retracted orientation (FIG. 17). When in the retracted orientation, the D-shaped tabs are beneath the base plate. When in the extended orientation, the tabs extend upwardly from the base plate to reveal eyelets such as that shown at 526a. The eyelets may be used to secure a safety chain 18 to the hitch assembly in the manner described above.

Referring to FIGS. 16 and 17, it will be noted that each D-shaped tab is provided with a stop 526b which is configured to engage an undersurface of the base plate to limit pivot of the D-shaped tab. In FIG. 16, the D-shaped tab is shown pivoted to near its a first limit where stop 526b engages an undersurface of plate 520 in a first position so as to define the tab's extended orientation. FIG. 17 shows the D-shaped tab pivoted 180-degrees to its a second limit where stop 526b engages the undersurface of plate 520 in a second position so as to define the tab's retracted orientation.

The tab typically pivots about a pin 526c which is pivotally coupled with corresponding hinge structure 520b of the base plate. As indicated, the pin is offset from the center of the tab. The pin thus acts as a pivot axis positioned to bias pivot of the tab toward one or the other of its limits (i.e., to either the retracted or extended orientation). A pivot lever (not shown) also may be provided to accommodate pivot of the tab by corresponding pivot of the pivot lever. The pivot lever may be accessible via the safety chain recess which may be widened near the pivot lever to accommodate passage of a finger therethrough.

While the present invention has been shown and described with reference to the foregoing operational principles and preferred embodiment, it will be apparent to those skilled in the art that other changes in form and detail may be made therein without departing from the spirit and scope of the invention as defined in the appended claims.

I claim:

1. A hitch assembly for use in coupling the towing vehicle with a to-be-towed vehicle, said hitch assembly comprising:
   a hitch base plate configured for attachment to the towing vehicle, said hitch base plate including a support surface contoured substantially similar to a body contour of the towing vehicle; and
   a safety chain connector configured for selected extension from said hitch base plate to provide a seat for a safety chain connected to the to-be-towed vehicle;
   said safety chain connector being adjustable to provide a hitch assembly which conforms generally to the body contour of the towing vehicle when said hitch assembly is not in use.

2. The hitch assembly of claim 1, wherein said hitch base plate defines a safety chain recess configured to house said safety chain connector, said safety chain connector being defined by a loop segment which retracts selectively into said safety chain recess.

3. The hitch assembly of claim 1, wherein said hitch base plate defines a safety chain recess configured to house said safety chain connector, said safety chain connector being defined by a pivotal flap having an eyelet which provides a seat for safety chains, said flap being pivotally adjustable to place said flap within said safety chain recess.

4. The hitch assembly of claim 1, wherein said hitch base plate defines a threaded safety chain recess configured to receive a safety chain connector defined by a correspondingly threaded eyelet member configured for removable attachment to said hitch base plate to selectively provide a seat for a safety chain of the to-be-towed vehicle.

5. The hitch assembly of claim 1, wherein said hitch base plate defines a safety chain recess configured to selectively capture said safety chain connector,; said safety chain connector including a generally T-shaped keeper portion configured for selected insertion and removal through said safety chain recess to selectively hold said safety chain connector in place, and an eyelet portion which provides a seat for a safety chain of the to-be-towed vehicle, said safety chain connector being adjustable by manipulation thereof to remove said keeper portion from said safety chain recess.

6. The hitch assembly of claim 1, wherein said hitch base plate defines a safety chain recess configured to house said safety chain connector, said safety chain connector being defined by a generally planar tab pivotally adjustable in a plane defined by said tab between an extended orientation wherein said tab extends upwardly through said safety chain recess of said base plate to reveal an eyelet which may be used to secure safety chains of the to-be-towed vehicle to the hitch assembly, and a retracted orientation wherein said tab is beneath said base plate.

7. The hitch assembly of claim 1 which further comprises a hitch mount configured for selected extension from said hitch base plate to provide a seat for a matching mount of the to-be-towed vehicle, said hitch mount being selectively removable from said base plate.

8. The hitch assembly of claim 1 which further comprises a hitch mount configured for selected extension from said hitch base plate to provide a seat for a matching mount of the to-be-towed vehicle, said base plate defining a hitch mount recess configured to house said hitch mount, said hitch mount being pivotally retractable into said hitch mount recess.

9. A hitch assembly which secures to a generally planar body surface of a towing vehicle for use in coupling the towing vehicle with a to-be-towed vehicle, said hitch assembly comprising:

- a hitch base plate configured for attachment to the towing vehicle, said hitch base plate including a support surface contoured substantially similar to a body contour of the towing vehicle, and defining a safety chain recess;
- a hitch mount configured for selected extension from said hitch base plate to provide a seat for a matching mount of the to-be-towed vehicle; and
- a safety chain connector including a generally T-shaped keeper portion configured for selected insertion and removal through said safety chain recess to selectively hold said safety chain connector in place, and an eyelet portion which provides a seat for a safety chain of the to-be-towed vehicle, said safety chain connector being adjustable by manipulation thereof to remove said keeper portion from said safety chain recess;
- said hitch assembly being adjustable by manipulation of the safety chain connector to remove said keeper portion from said safety chain recess, and being adjustable by manipulation of said hitch mount to remove said hitch mount from extension from said base plate, thereby adapting said support surface to lie generally flush with the body surface of the towing vehicle when said hitch assembly is not in use.

10. The hitch assembly of claim 9, wherein said base plate includes a grip portion for selectively gripping a cross member of said keeper portion of said safety chain connector.

11. The hitch assembly of claim 10, wherein said keeper portion is removed from said safety chain recess by first positioning said cross member of said keeper portion below said grip portion, second, rotting said safety chain connector to bring said cross member into alignment with said safety chain recess, and third, lifting said safety chain connector to draw said keeper portion through said safety chain recess.

12. The hitch assembly of claim 9, wherein said hitch assembly includes a plurality of safety chain connectors arranged symmetrically about said hitch mount.

13. The hitch assembly of claim. 9, wherein said hitch mount is selectively removable from said base plate.

14. The hitch assembly of claim 9, wherein said base plate defines a hitch mount recess configured to house said hitch mount, said hitch mount being pivotally retractable into said hitch mount recess.

15. A hitch assembly which secures to a generally planar body surface of a towing vehicle for use in coupling the towing vehicle with a to-be-towed vehicle, said hitch assembly comprising:

- a hitch base plate configured for attachment to the towing vehicle, said hitch base plate including a support surface contoured substantially similar to a body contour of the towing vehicle, and defining a safety chain recess;
- a hitch mount configured for selected extension from said hitch base plate to provide a seat for a matching mount of the to-be-towed vehicle; and
- a safety chain connector including a safety chain connector defined by a generally planar tab pivotally adjustable in a plane defined by said tab between an extended orientation wherein said planar tab extends upwardly through said safety chain recess to reveal an eyelet which may be used to secure a safety chain of the to-be-towed vehicle to the hitch assembly and a retracted orientation wherein said tab extends downwardly from said base plate, thereby adapting said support surface to lie generally flush with the body surface of the towing vehicle when the hitch assembly is not in use.

16. The hitch assembly of claim 15, wherein said safety chain connector is pivotal about a pivot axis which is offset from a center of the tab so as to bias pivot of said tab toward either one of said retracted and extended orientations.

17. The hitch assembly of claim 15, wherein said hitch assembly includes a plurality of safety chain connectors arranged symmetrically about said hitch mount.

18. The hitch assembly of claim 15, wherein said hitch mount is selectively removable from said base plate.

19. The hitch assembly of claim 15, wherein said base plate defines a hitch mount recess configured to house said hitch mount, said hitch mount being pivotally retractable into said hitch mount recess.

20. The hitch assembly of claim 15, wherein said safety chain connector is defined by a generally planar D-shaped tab.

\* \* \* \* \*